(12) United States Patent
Ehrhart et al.

(10) Patent No.: US 6,459,185 B1
(45) Date of Patent: Oct. 1, 2002

(54) ELECTRICAL MACHINE WITH PERMANENT MAGNETS

(75) Inventors: Peter Ehrhart, München; Christian Lucas, Gräfelfing, both of (DE)

(73) Assignee: Magnet-Motor Gesellschaft fur Magnetmotorische Technik MBH, Starnberg (DE)

( * ) Notice: Subject to any disclaimer, the term of this patent is extended or adjusted under 35 U.S.C. 154(b) by 0 days.

(21) Appl. No.: 09/763,680
(22) PCT Filed: Aug. 19, 1999
(86) PCT No.: PCT/EP99/06082
§ 371 (c)(1),
(2), (4) Date: Apr. 30, 2001
(87) PCT Pub. No.: WO00/11777
PCT Pub. Date: Mar. 2, 2000

(30) Foreign Application Priority Data

Aug. 24, 1998 (DE) .......................................... 198 38 378

(51) Int. Cl.$^7$ ............................................. H02K 21/12
(52) U.S. Cl. .......................... 310/156.45; 310/156.35; 310/156.38; 310/266
(58) Field of Search ...................... 310/156.45, 156.34, 310/156.35, 156.36, 156.38, 156.41, 156.42, 156.43, 156.44, 156.58, 156.68, 156.81, 156.82, 156.01, 266, 112

(56) References Cited

U.S. PATENT DOCUMENTS 3,629,626 A * 12/1971 Abbott ..................... 310/68 D
4,757,200 A * 7/1988 Pouillange ................. 310/49 R
4,758,756 A * 7/1988 Pouillange .................. 310/152
4,864,169 A * 9/1989 Rioux et al. ................... 310/12
5,004,944 A * 4/1991 Fisher ........................ 310/266
5,081,388 A * 1/1992 Chen .......................... 310/266
5,212,419 A * 5/1993 Fisher et al. ................. 310/254
5,345,133 A * 9/1994 Satake ........................ 310/266

FOREIGN PATENT DOCUMENTS

DE 39 15 526 8/1990
FR 2 606 951 5/1988
WO WO92 20131 11/1992

* cited by examiner

Primary Examiner—Thomas M. Dougherty
Assistant Examiner—Thanh Lam
(74) Attorney, Agent, or Firm—Venable; Robert Kinberg

(57) ABSTRACT

An electric machine comprising the following features: (a) an outer, first stator part and an inner, second stator part, the two stator parts being coaxial and being radially spaced apart by an intermediate space; (b) each stator part has, facing the intermediate space, a circumferential series of stator poles, at least a partial number of which carries a winding; (c) a rotor part disposed in the intermediate space; (d) the rotor part has a circumferential series of alternating permanent magnets and magnetic flux conducting pieces, said permanent magnets being magnetized in circumferential direction; (e) the width of the permanent magnets—measured in circumferential direction—is larger on the central radius of the rotor part than radially outside and radially inside on the rotor part and the width of the magnetic flux conducting pieces—measured in circumferential direction—is correspondingly smaller on the central radius of the rotor part than radially outside and radially inside on the rotor part.

16 Claims, 3 Drawing Sheets

ELECTRICAL MACHINE WITH PERMANENT MAGNETS

A first subject matter of the invention is an electric machine comprising the following features:
(a) an outer, first stator part and an inner, second stator part, the two stator parts being coaxial and being radially spaced apart by an intermediate space;
(b) each stator part has, facing the intermediate space, a circumferential series of stator poles, at least a partial number of which carries a winding;
(c) a rotor part disposed in the intermediate space;
(d) the rotor part has a circumferential series of alternating permanent magnets and magnetic flux conducting pieces, said permanent magnets being magnetized in circumferential direction;
(e) the width of the permanent magnets—measured in circumferential direction—is larger on the central radius of the rotor part than radially outside and radially inside on the rotor part and the width of the magnetic flux conducting pieces—measured in circumferential direction—is correspondingly smaller on the central radius of the rotor part than radially outside and radially inside on the rotor part;
(f) a first circumferential series of magnetic circuits which—as seen in a plane perpendicular to the rotor axis—each extend through two adjacent stator poles of the first stator part in the plane considered and through two adjacent magnetic flux conducting pieces of the rotor part in the plane considered and through the permanent magnet between the two adjacent magnetic flux conducting pieces in the plane considered, and a second circumferential series of magnetic circuits which—as seen in a plane perpendicular to the rotor axis—each extend through two adjacent stator poles of the second stator part in the plane considered and through two adjacent magnetic flux conducting pieces of the rotor part in the plane considered as well as through the permanent magnet between the two adjacent magnetic flux conducting pieces in the plane considered.

A second subject matter of the invention is an electric machine comprising the following features:
(a) a first stator part and a second stator part, the two stator parts being arranged along a common axis and being axially spaced apart by an intermediate space;
(b) each stator part has, facing the intermediate space, a circumferential series of stator poles, at least a partial number of which carries a winding;
(c) a rotor part disposed in the intermediate space;
(d) the rotor part has a circumferential series of alternating permanent magnets and magnetic flux conducting pieces, said permanent magnets being magnetized in circumferential direction;
(e) the width of the permanent magnets—measured in circumferential direction—is larger in the axially central portion of the rotor part than at the axial faces of the rotor part and the width of the magnetic flux conducting pieces—measured in circumferential direction—is correspondingly smaller in the axially central portion of the rotor part than at the axial faces of the rotor part;
(f) a first circumferential series of magnetic circuits which—as seen in a developed circumferential area—each extend through two adjacent stator poles of the first stator part in the circumferential area considered and through two adjacent magnetic flux conducting pieces of the rotor part in the circumferential area considered and through the permanent magnet between the two adjacent magnetic flux conducting pieces in the circumferential area considered, and a second circumferential series of magnetic circuits which—as seen in a developed circumferential area—each extend through two adjacent stator poles of the second stator part in the circumferential area considered and through two adjacent magnetic flux conducting pieces of the rotor part in the circumferential area considered as well as through the permanent magnet between the two adjacent magnetic flux conducting pieces in the circumferential area considered.

The electric machine according to the second subject matter of the invention differs from the electric machine according to the first subject matter of the invention in that the two air gaps (one air gap between the first stator part and the rotor part and a second air gap between the rotor part and the second stator part) are in two planes perpendicular to the rotor axis, whereas in the first subject matter of the invention there are provided two circumferential air gaps in radially spaced apart manner.

The electric machines according to the invention distinguish themselves by very high power density. This results from the presence of two stator parts and a common rotor part therebetween, but also from the geometry indicated of the magnetic flux conducting pieces and the permanent magnets. In addition thereto, the mutual "self-anchoring effect" of the components of the rotor parts is to be emphasized.

The electric machines according to the invention in particular may be machines outputting mechanical power (i.e. electric motors) or machines taking up mechanical power (i.e. generators). They are preferably electronically commutated electric motors or generators with take-off of electric power via active current converters.

In the first subject matter of the invention, the width mentioned of the magnetic flux conducting pieces radially inside on the rotor part and radially outside on the rotor part each is preferably smaller than the radial dimension of the particular magnetic flux conducting piece. In the second subject matter of the invention, the width mentioned of the magnetic flux conducting pieces on the axial faces of the rotor part each is analogously preferably smaller than the axial dimension of the particular magnetic flux conducting piece. This measure in both cases has the effect that the rotor part is designed in accordance with the magnetic flux concentration principle, i.e. a higher magnetic flux density is present at the exit of the magnetic flux conducting pieces to the corresponding air gap than in the respective magnetic flux generating permanent magnet.

In case of the first subject matter of the invention, the rotor part preferably is a constituent part of a cup-shaped portion of the rotor. In this case, the rotor can be designed so as to be supported on one axial side of the machine only, which has practical advantages for many fields of application.

Preferably, the cup-shaped portion of the rotor has a rotor base wall and the rotor part is mounted to the base wall via circumferentially distributed tie rods, with the tie rods being mounted on the one hand on the base wall and on the other hand extending through bores in the magnetic flux conducting pieces and/or the permanent magnets. This way of mounting by means of tie rods is particular advantageous in terms of production technology. It is pointed out that, due to the geometry mentioned of the permanent magnets and the magnetic flux conducting pieces, it is basically sufficient to directly fix either only the magnetic flux conducting pieces or the permanent magnets by means of the tie rods, since the respective other constituent parts, permanent magnets/ magnetic flux conducting pieces, are held indirectly via positive engagement. On the other hand, it is indeed possible as well to secure both constituent parts, i.e. permanent magnets and magnetic flux conducting pieces, to the rotor base wall by means of tie rods each.

The magnetic flux conducting pieces and/or the permanent magnets may be subdivided, in the direction of the rotor axis, into a plurality of electrically isolated sections, which is preferred. These sections preferably can be adhesively joined to each other and/or be held together by tie rods. This reduces eddy current losses.

The magnetic flux conducting pieces and the permanent magnets preferably are subdivided, in the direction of the rotor axis, into a plurality of sections which are separated by intermediate rings of magnetically non-conducting material, which best should be electrically non-conducting as well. By means of this construction, it is possible to build rotor parts with increased mechanical strength. Between the respective intermediate rings, the magnetic flux conducting pieces and/or the permanent magnets may be further subdivided more finely into subsections which are electrically isolated from each other. It may be advantageous in certain designs to adhesively join magnetic flux conducting piece sections and/or permanent magnet sections to the intermediate rings, in particular if these are not held directly by tie rods.

The intermediate rings preferably are of smaller outer diameter than the magnetic flux conducting pieces and the permanent magnets and/or of larger inner diameter than the magnetic flux conducting pieces and the permanent magnets. This provides for advantages in terms of adhesion technology and for an improved design of the inner and outer surfaces of the rotor part.

The rotor part, on the outside thereof, preferably is provided with a circumferential strengthening bandage that preferably has a thickness of less than 1.5 mm. The strengthening bandage is capable of relieving the structure of the rotor part of a considerable portion of the centrifugal forces arising. Due to the fact that the strengthening bandage is located in the radially outer air gap, the thickness thereof should be as small as possible. A preferred material for the strengthening bandage is plastics material reinforced with carbon fibers.

Analogously therewith, the rotor part of the second subject matter of the invention preferably is a constituent part of a disc-shaped portion of the rotor. Advantages in terms of manufacturing technology are obtained here too. Preferably, the rotor part is provided on its outside with a circumferential strengthening bandage. In case of the second subject matter of the invention, the thickness of the strengthening bandage can be chosen more freely as said bandage is not disposed in an air gap.

In case of both subject matters of the invention, the number of stator poles on the first stator part preferably is equal to the number of stator poles on the second stator part. In addition thereto, it is preferred in this context that each stator pole on the first stator part has located opposite thereto, beyond the rotor part, a stator pole on the second stator part with the same electromagnetic phase position, as one moves (with respect to the first subject matter of the invention) along a radius in inward direction, and (with respect to the second subject matter of the invention) along a line parallel to the rotor axis, respectively. These measures result in optimum magnetic flux exploitation and in a desirable symmetry of the magnetic fluxes.

The following holds for both subject matters of the invention: preferably, the first stator part and/or the second stator part is provided with direct cooling by fluid flow along the windings; preferably, the first stator part and/or the second stator part is provided with stator back cooling. In case of direct cooling by fluid flow, the area containing the stator pole ends is sealed in fluid-tight manner on all sides e.g. by a closure member, such as a strong film material. It is then possible to flow a cooling fluid through the channels between two adjacent stator poles each, with said channels being filled to a considerable part by winding wires. As an alternative or in addition thereto, cooling fluid channels can be provided in the stator poles. Suitable cooling fluids are first of all liquids, but gaseous cooling media are possible as an alternative as well.—The additional preferred possibility consists in more indirect stator back cooling, in particular with cooling fluid channels for liquid or gaseous cooling fluid in or on the stator back. However, it is also possible to cool the surface of the stator back facing away from the air gap with cooling liquid or gaseous cooling fluid.—In case of the first subject matter of the invention, a design with direct liquid cooling along the windings on the second stator part and with stator back cooling on the first stator part is particularly preferred.

In case of the first subject matter of the invention, the first stator part and the second stator part preferably are mounted on a common stator base wall; a closed housing in the conventional sense often is no longer necessary at all. On or in the stator base wall, there may be applied preferably a coolant supply as well as electric power and control lines and, if desired, also the electronic system provided for operation of the machine.

In accordance with an alternative design, preferably the first stator part and the second stator part are each mounted separately on the supporting part of the machine, preferably the machine housing.

In both subject matters of the invention, it is preferably provided that at least one active inverter electronics system is connected to the coils of the machine. In case of an electric motor, the inverter electronics system provides for the electronic commutations of the coil currents and, optionally, for power control and, optionally, speed control of the electric motor.

In case of a current generator, there is preferably provided a rectifier means connected to the windings of the machine for generating direct current by means of the current generator. In the simplest case, this may be a passive rectifier. More preferable is a controlled rectifier operating e.g. according to the principle of phase-angle control. Most preferred are active rectifiers. These may be composed like inverters in terms of electronics. They may have the function of delivering an adjustable voltage and/or the function of delivering a voltage that is substantially independent of the speed.

The invention and preferred developments of the invention will be elucidated in more detail hereinafter by way of embodiments illustrated schematically in the drawings wherein FIG. 1 shows a cross-sectional view perpendicular to the rotor axis, illustrating part of an electric machine according to a first embodiment;

Figure 1:
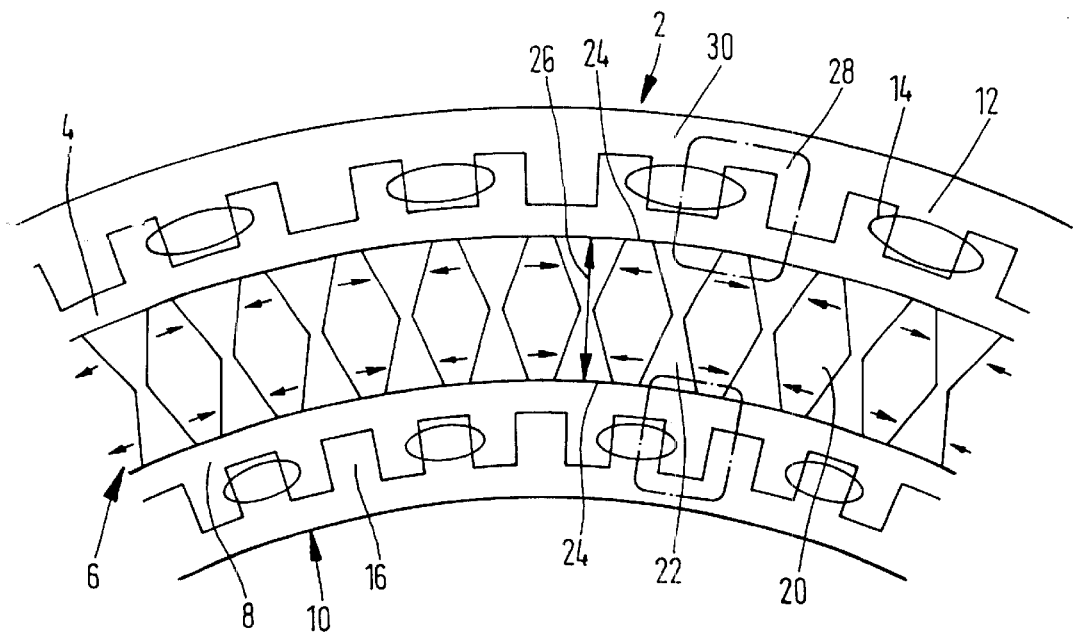

FIG. 1 shows a radially outer, first stator part 2, an annular rotor part 6 radially inside thereof and spaced therefrom by a first substantially cylindrical air gap 4, and a radially inner, second stator part 10 radially inside thereof and spaced therefrom by a second substantially cylindrical air gap 8. The arrangement of the parts of the machine described in the overall construction of the machine will still become more evident in the following description of FIGS. 3 and 4.

The first stator part 2 is provided with a circumferential series of spaced apart stator poles 12 directed radially inwards towards the first air gap 4. Every other one of these stator poles 12 has a copper wire winding 14 wound thereon. Quite analogously thereto, the second stator part 10 is provided with stator poles 16 and windings 18, however with the stator poles 16 being directed radially outwards towards the second air gap 8.

In the intermediate space between first stator part 2 and second stator part 10, there is disposed the rotor part 6 which in total has substantially the shape of a hollow cylinder. Rotor part 6 is composed of permanent magnets 20 each of rhombic shape (two trapezoidal configurations adjoining each other with the longer base sides), and magnetic flux conducting pieces 22 of X-shaped cross-section each (two trapezoidal configurations adjoining each other with the short base sides). Permanent magnets 20 and conducting pieces 22 alternate in regular manner. Permanent magnets 20 are magnetized in circumferential direction, as indicated by arrows, in alternating manner from north to south in clockwise direction and from north to south in counterclockwise direction. It can be seen that the magnetic flux exit area 24 of each particular conducting piece 22 towards the first air gap 4 and towards the second air gap 8, respectively—as measured in circumferential direction—is of lesser width than the dimension 26—measured in radial direction—of the particular conducting piece 22 and an adjacent permanent magnet 20, respectively, so that there is a higher magnetic flux density at the magnetic flux exit area 24 than in the permanent magnets 20. The first air gap 4 is located between the substantially cylindrical radially inner confining area of the first stator part 2 and the substantially cylindrical radially outer confining area of the rotor part 6. The second air gap 8 is located between the substantially cylindrical radially inner confining area of the rotor part 6 and the substantially cylindrical radially outer confining area of the second stator part 10.

In addition thereto, FIG. 1 shows some of the magnetic circuits 28 which finally effect the function of the machine. With respect to the first air gap 4, it can be seen that, in the cross-sectional plane considered of the machine (which is the drawing plane of FIG. 1), each magnetic circuit passes through a radially outer stator pole 12, through part of the stator back 30 between two stator poles 12, through a circumferentially adjacent radially outer stator pole 12, across the first air gap 4, through a conducting piece 22, through a circumferentially adjoining permanent magnet 20, through an adjoining flux conducting piece 22 and across the first air gap 4 to the initial stator pole 12. As regards the second air gap 8, the situation is quite analogous, with the radially inner stator poles 16 just replacing the radially outer stator poles 12.

Figure 3:
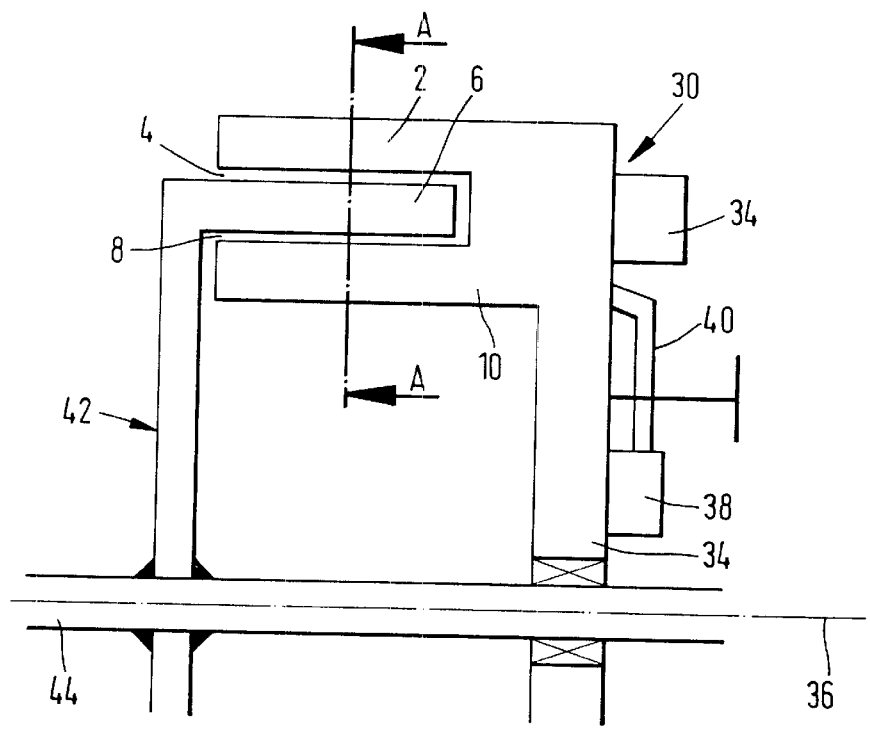
FIG. 3 shows an axial sectional view of part of an electric machine according to a third embodiment, for illustrating the basic overall construction.
Figure 4:
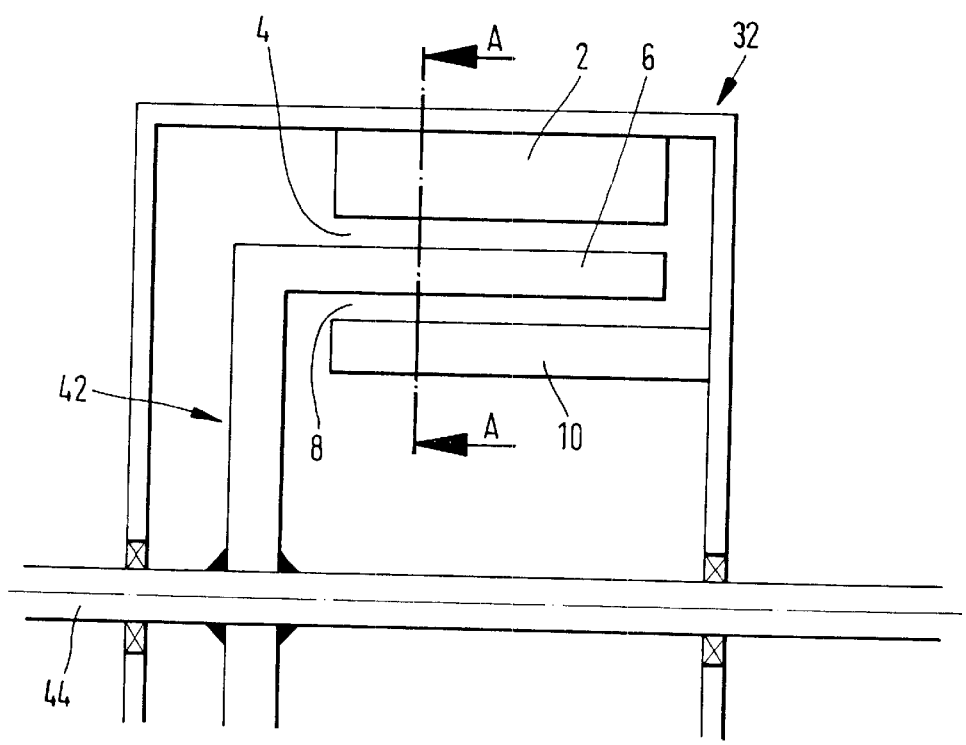
FIG. 4 shows an axial sectional view of part of an electric machine according to a fourth embodiment, for illustrating the basic construction.

The arrangement of the machine parts described (first stator part 2, rotor part 6, second stator part 10) within the overall construction of the machine is conceivable better by way of FIGS. 3 and 4. The section A—A in each figure illustrates the type of section resulting in the configuration of FIG. 1. The first stator part 2 and the second stator part 10 are constituent parts of the (overall) stator 30 which in the embodiment of FIG. 3—roughly speaking—is of overall cup-shaped configuration and in the embodiment of FIG. 4 is formed in a substantially cylindrical housing 32 having a hollow cylindrical extension from one of the two housing end walls. In the embodiment according to FIG. 3, first stator part 2 and second stator part 10 are mounted on a common stator base wall 34 extending perpendicularly to the rotor axis 36. As indicated schematically, stator base wall 34 carries on the outside thereof a coolant supply 37, an electronic system 38 for operation of the machine, as well as electric power and control lines 40, in particular between the electronic system 38 and the windings 14 of stator poles 12 and 16. Both in the embodiment according to FIG. 3 and in the embodiment according to FIG. 4, the rotor part 6 is part of a—roughly speaking—cup-shaped rotor 42 that is non-rotatably connected to a shaft 44. Shaft 44 is rotatably supported in stator 30 or housing 32, respectively.

Figure 2:
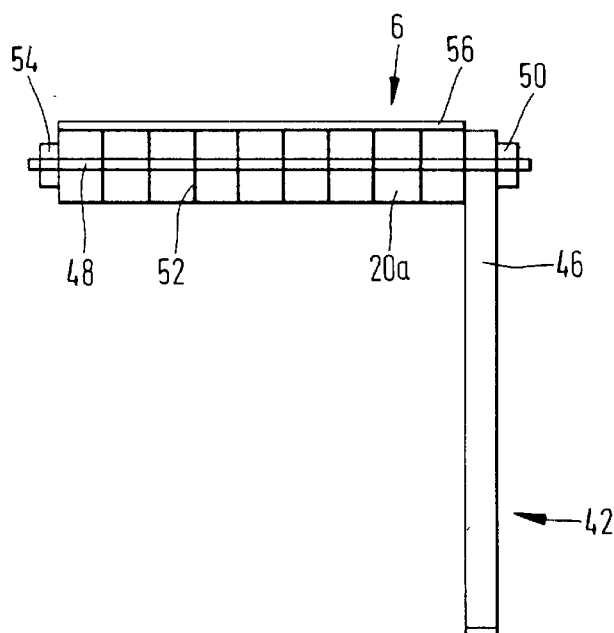
FIG. 2 shows an axial sectional view of part of an electric machine according to a second embodiment, for illustrating the type of mounting of the rotor part.

FIG. 2 shows one of the preferred possibilities of attaching the rotor part 6 to a rotor base wall 46 of an in total—roughly speaking—cup-shaped rotor 42. Distributed along the circumference, there is provided a multiplicity of tie rods 48, e.g. in the form of threaded bolts. At one end, the respective tie rod 48 is passed through a bore in rotor base wall 46, where a first nut 50 is threadedly applied. The tie rod extends in axial direction and, in bores, penetrates quite a number of permanent magnet sections 20a and/or quite a number of conducting piece sections 22a; between adjacent permanent magnet sections 20a and between adjacent conducting piece sections 22a each, there is provided an intermediate ring 52 of magnetically non-conducting material, also having a bore each through which said tie rod 48 passes. At the end of tie rod 48 remote from the rotor base wall 46, there is another nut 54 threadedly applied, which clamps the entire "package" of permanent magnet sections 20a and intermediate rings 52 and, respectively, of conducting piece sections 22a and intermediate rings 52 together as well as against rotor base wall 46. It is to be understood that, for each particular drawing plane, there may also be provided a plurality of tie rods 48 in radially spaced apart manner.

FIG. 2 moreover reveals the possibility of applying a strengthening bandage 56 on the radially outer confining area of rotor part 6, which has the effect of a clamping ring and thus takes up part of the forces acting on the permanent magnets 20 and the conducting pieces 22 due to the centrifugal forces.

Reverting to FIG. 1, it can be seen that the geometry of the permanent magnets 20 and conducting pieces 22 provides for a mutual "self-anchoring effect" of these components. By fixing either the permanent magnets 20 or the conducting pieces 22 in radial direction, the respective other components cannot move radially outside or radially inside in the first air gap 4 by the effect of the centrifugal forces and the effect of the magnetic forces of attraction.

Figure 5:
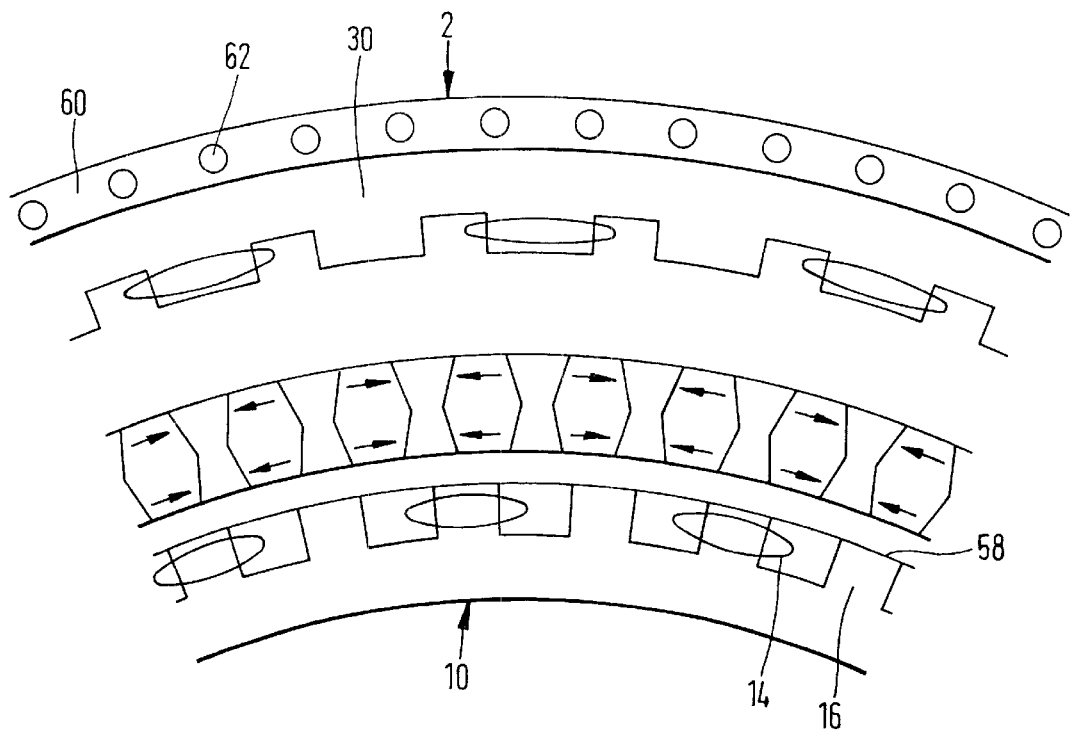
FIG. 5 shows a cross-sectional view perpendicular to the rotor axis, showing part of an electric machine of similar construction as the first embodiment according to FIG. 1, but now for illustrating the cooling means.

FIG. 5 largely corresponds to FIG. 1, however illustrating in addition elements for cooling the machine. The second stator part 10, on the radially outer confining area, has a closure member 58 applied thereto, so to speak over the ends of the stator poles, which e.g. is in the form of a fiber-reinforced, firm plastics film. By way of the closure member 58, the grooves between respective adjacent stator poles 16 are sealed towards the outside, so that—presupposing an axial seal that is not shown in the drawings—it is now possible to pump a cooling liquid or blow a cooling gas through the grooves which are filled in part with the wire of winding 14. However, it is normally sufficient to directly cool the winding heads of the coils, the part of the windings projecting from the stator part, as described. In this manner, it is possible to achieve direct winding cooling which, of course, entails cooling of the stator material as well.

In the first stator part 2, there is illustrated an indirect cooling means by cooling the stator back 30. The radially outer, substantially cylindrical terminating area of the first stator part 2 has a cooling layer 60 applied thereto which contains channels 62 for pumping cooling liquid therethrough. As an alternative thereto, it would also be possible to directly drill the cooling channels 62 into the stator material, as shown at two locations by broken lines. Another variation would be the formation of ribs on the first stator part 2 and air cooling in this region.

Figure 6:
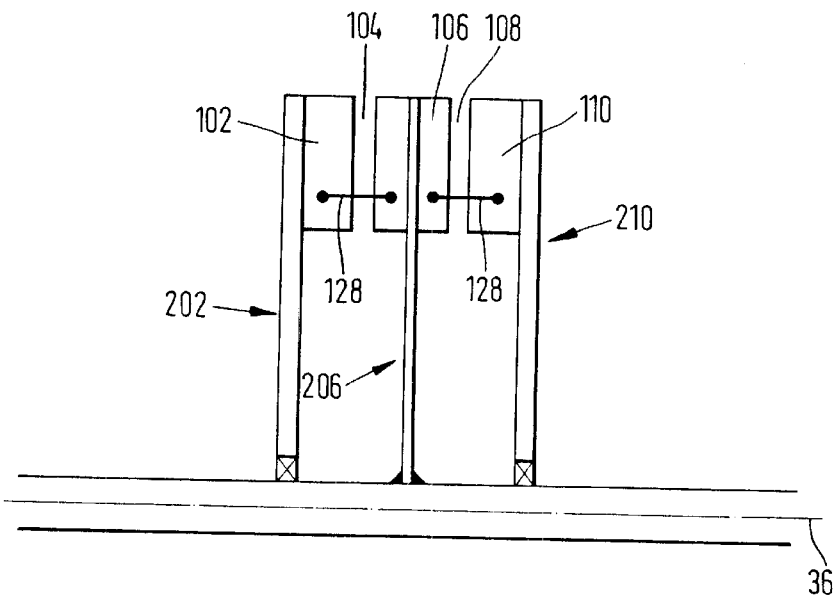
FIG. 6 shows an axial sectional view of part of an electric machine according to a fifth embodiment, for illustrating the basic construction thereof.

FIG. 6 illustrates an electric machine according to the basic conception of the second subject matter of the invention. This view again shows a first stator part 102, a first air gap 104 axially adjacent thereto, a rotor part 106 axially adjacent the latter, a second air gap 106 axially adjacent the latter part, and a second stator part 110 axially adjacent the second air gap 108. The first stator part 102 is part of an in total—roughly speaking—disc-shaped stator 202, and the second stator part 110 is part of an in total—roughly speaking—disc-shaped stator 210. The rotor part 106 is part of an in total—roughly speaking—disc-shaped rotor 206. The first air gap 104 and the second air gap 108 are each lying in a plane that is perpendicular to the rotor axis 36.

To visualize the arrangement of the permanent magnets 20 and the conducting pieces 22 in the embodiment of FIG. 6, one takes the rotor part 6 of FIG. 1 and bends the same from the circular shape shown into a plane. When this "rotor part strip" is placed with the magnetic flux exit areas 24 on the two axial faces of rotor part 106 and the "rotor part strip" is bent about the rotor axis 36 as axis of curvature, one obtains the arrangement of the permanent magnets 20 and conducting pieces 22 in rotor part 106. The magnetic circuits 128 of the machine then are conceivable in cylindrical circumferential areas, at best after development thereof in a plane. A short portion of two magnetic circuits 128 each is illustrated in dot-and-dash lines.

What is claimed is:

1. An electric machine comprising the following features:

(a) an outer, first stator part and an inner, second stator part, the two stator parts being coaxial and being radially spaced apart by an intermediate space;

(b) each stator part has, facing the intermediate space, a circumferential series of stator poles, at least a partial number of which carries a winding;

(c) a rotor part disposed in the intermediate space;

(d) the rotor part has a circumferential series of alternating permanent magnets and magnetic flux conducting pieces, said permanent magnets being magnetized in circumferential direction;

(e) the width of the permanent magnets—measured in circumferential direction—is larger on the central radius of the rotor part than radially outside and radially inside on the rotor part and the width of the magnetic flux conducting pieces—measured in circumferential direction is correspondingly smaller on the central radius of the rotor part than radially outside and radially inside on the rotor part;

(f) a first circumferential series of magnetic circuits which—as seen in a plane perpendicular to the rotor axis—each extend through two adjacent stator poles of the first stator part in the plane considered and through two adjacent magnetic flux conducting pieces of the rotor part in the plane considered and through the permanent magnet between the two adjacent magnetic flux conducting pieces in the plane considered, and a second circumferential series of magnetic circuits which—as seen in a plane perpendicular to the rotor axis—extend through two adjacent stator poles of the second stator part in the plane considered and through two adjacent magnetic flux conducting pieces of the rotor part in the plane considered as well as through the permanent magnet between the two adjacent magnetic flux conducting pieces in the plane considered, characterized in (g) that the magnetic flux conducting pieces and/or the permanent magnets, in the direction of the rotor axis, are subdivided into a plurality of electrically isolated sections.

2. An electric machine according to claim 1, characterized in that the said width of the magnetic flux conducting pieces radially inside on the rotor part and radially outside on the rotor part each is smaller than the radial dimension of the particular magnetic flux conducting piece.

3. An electric machine according to claim 1, characterized in that the rotor part is part of a portion of the rotor of cup-shaped configuration.

4. An electric machine according to claim 3, characterized in that the cup-shaped portion of the rotor has a rotor base wall and in that the rotor part is secured to the base wall by means of circumferentially distributed tie rods, the tie rods being secured on the one hand to the base wall and on the other hand extending through bores in the magnetic flux conducting pieces and/or in the permanent magnets.

5. An electric machine according to claim 1, characterized in that the sections of the magnetic flux conducting pieces and/or of the permanent magnets, are adhesively joined together and/or held together by tie rods.

6. An electric machine according to claim 1, characterized in that the magnetic flux conducting pieces and the permanent magnets, in the direction of the rotor axis, are subdivided into several sections that are separated by intermediate rings of magnetically non-conducting material.

7. An electric machine according to claim 1, characterized in that the rotor part is part of a portion of the rotor of cup-shaped configuration.

8. An electric machine according to claim 1, characterized in that the rotor part is provided on the outside thereof with a circumferential strengthening bandage having preferably a thickness of less than 1.5 mm.

9. An electric machine according to claim 1, characterized in that the number of stator poles on the first stator part and the number of stator poles on the second stator part are equal.

10. An electric machine according to claim 1, characterized in that each stator pole on the first stator part has located opposite thereto, beyond the rotor part, a stator pole on the second stator part with the same electromagnetic phase position, when one moves inwardly along a radius.

11. An electric machine according to claim 1, characterized in that the first stator part and/or the second stator part is provided with direct cooling by fluid flow along the windings.

12. An electric machine according to claim 1, characterized in that the first stator part and/or the second stator part is provided with stator back cooling.

13. An electric machine according to claim 1, characterized in that the first stator part and the second stator part are mounted on a common stator base wall.

14. An electric machine according to claim 13, characterized in that the stator base wall has attached thereto a coolant supply as well as electric power and control lines.

15. An electric machine according to claim 1, characterized in that the first stator part and the second stator part are each mounted separately on the supporting component part of the machine.

16. An electric machine according to claim 1, characterized in that at least one active inverter electronics system is connected to the windings of the machine.

* * * * *